UNITED STATES PATENT OFFICE.

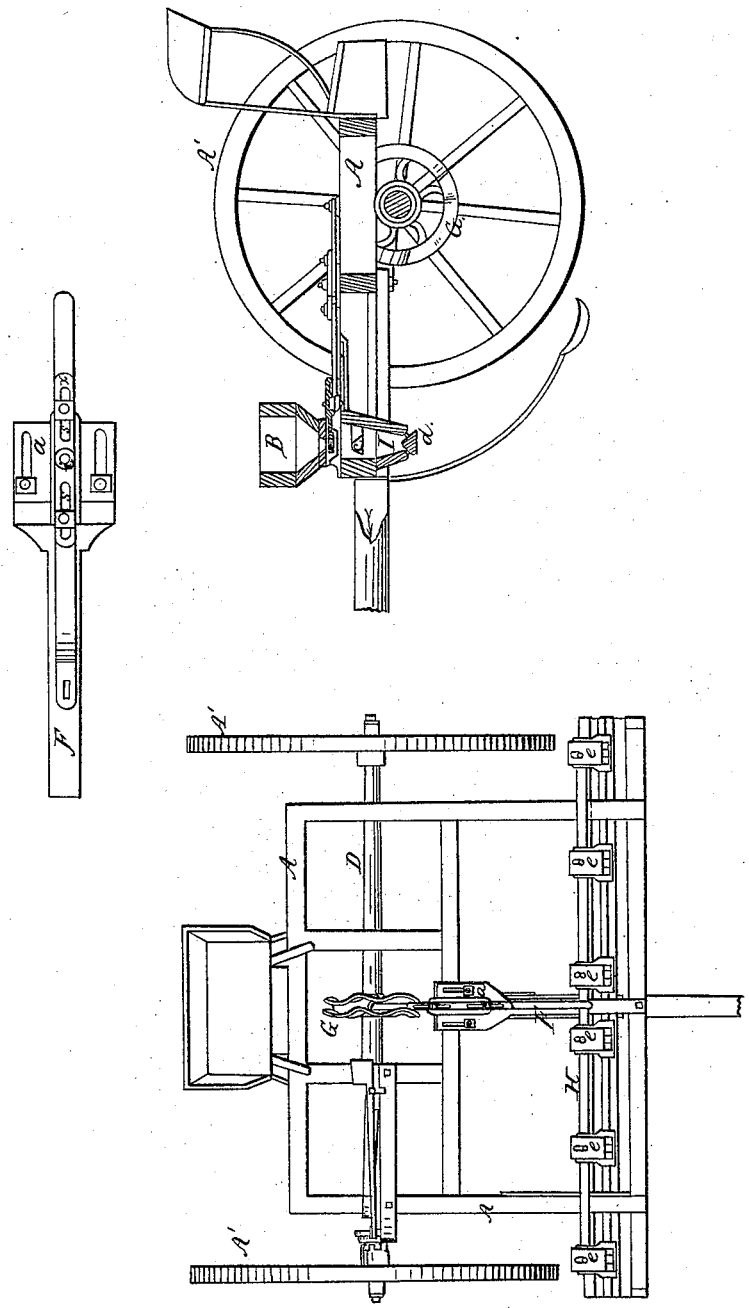

ALEX. McELROY AND JOHN H. KIMBLE, OF FOX LAKE, WISCONSIN.

IMPROVEMENT IN SEEDING-MACHINES.

Specification forming part of Letters Patent No. 29,505, dated August 7, 1860.

*To all whom it may concern:*

Be it known that we, ALEXANDER McELROY and JOHN H. KIMBLE, of Fox Lake, in the county of Dodge and State of Wisconsin, have invented certain new and useful Improvements in Seeding-Machines; and we do hereby declare that the following is a full, clear, and exact description of the same, reference being had to the accompanying drawings, and to the letters of reference marked thereon.

The nature of our invention consists in constructing and arranging the several parts of this machine substantially in the manner here inafter described.

In the annexed drawings, Figure 1 is a plan view with seed-hopper removed. Fig. 2 is a longitudinal vertical section. Fig. 3 is a detached view of the adjustable plate and vibrating lever, which will be described.

In the figures, A represents the frame of the machine, which is constructed in a substantial manner, and which is supported upon an axle, D, said axle being supported and carried by the wheels A' A', which turn loosely upon it when the machine is not working.

Secured about midway upon the axle D is a wheel, G, which has a zigzag or cam groove cut in its periphery.

F is a vibrating lever, one end of which is provided with a roller, which works in the cam-groove in the wheel G, while the other end is secured to the seed-slide H for the purpose of operating. This lever F has a movable fulcrum for the purpose of changing the length of stroke of the seed-bar, said fulcrum being formed thus: The plate $a$ is provided with a pin, $i$, which passes through the lever F, the opening through which the pin passes being a long slot. The pin $i$ passes into a bar, $x$.

The bar $x$ is provided with two slots through which bolts or pins secured to the lever F pass. The plate $a$ is also provided with slots and pins, so that it can slide upon the frame. When the plate $a$ moves the pin $i$, which is the fulcrum of the lever, moves with it, and so does the bar $x$.

The plate and the bar $x$ may be secured to the lever, when the fulcrum is fixed at any desired point by screwing up the nuts upon the bolts passing through the slots.

B represents the seed-hopper, and H the seeding-bar under it. This bar is provided with a series of slides, $e\ e\ e$, which regulate the size of the opening through which the seed passes.

I represents a box under the seed-hopper, which has converging sides, as represented in Fig. 2. In this converging box are placed two triangular bars, $c$ and $d$. These bars stand under the hopper, and the seed falls upon them and is scattered and divided before it reaches the ground.

This machine is intended for casting seed broadcast upon the ground. The seed falls from the hopper in drills, but is divided and separated before it falls to the ground by means of the bars $c$ and $d$ within the box I.

An ordinary form of clutch with levers to operate it is used for connecting the wheels to the shaft in such a manner that they will revolve together when necessary, for the purpose of driving the cam-wheel G, thus imparting motion to the seed-slide through the lever F.

We do not wish to claim any of the parts of this machine separately.

The seed-box, it will be seen, is placed in front of the wheels, so that it may be prolonged or extended, so as to cover more ground without widening the frame or lengthening the axle upon which the driving-wheels are secured.

Having thus fully described our invention, what we claim as new, and desire to secure by Letters Patent, is—

1. The arrangement of the adjustable plate $a$ and vibrating lever F, with the cam-wheel G, distributing-bar H, and slides $e\ e$, substantially in the manner and for the purpose specified.

2. The arrangement of the seed-box B and the seed-bar H, as constructed with the converging box I and the triangular dividing-bars $d$ and $c$, the same being used substantially as and for the purpose specified.

ALEXANDER McELROY.
JOHN H. KIMBLE.

Witnesses:
FRANCIS HAMILTON,
GEO. W. BURCHARD.